(12) United States Patent
Juffa

(10) Patent No.: US 6,247,117 B1
(45) Date of Patent: Jun. 12, 2001

(54) APPARATUS AND METHOD FOR USING CHECKING INSTRUCTIONS IN A FLOATING-POINT EXECUTION UNIT

(75) Inventor: Norbert Juffa, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/265,230

(22) Filed: Mar. 8, 1999

(51) Int. Cl.[7] .................................................. G06F 15/00
(52) U.S. Cl. ........................ 712/222; 712/224; 712/228; 712/235; 712/239; 708/525
(58) Field of Search ................... 712/222, 224, 712/235, 239, 228; 708/525

(56) References Cited

U.S. PATENT DOCUMENTS

| | | | |
|---|---|---|---|
| 5,487,022 | * 1/1996 | Simpson et al. | 708/205 |
| 5,931,943 | * 8/1999 | Orup | 712/222 |
| 6,044,454 | * 3/2000 | Schwarz et al. | 712/201 |

* cited by examiner

Primary Examiner—Eddie Chan
Assistant Examiner—Gautam R. Patel
(74) Attorney, Agent, or Firm—Conley, Rose & Tayon, PC; B. Noël Kivlin

(57) ABSTRACT

The use of checking instructions to detect special and exceptional cases of a defined data format in a microprocessor is disclosed. Generally speaking, a checking instruction is included with the microcode of floating-point instructions to detect special and exceptional cases of operand values for the floating-point instructions. A checking instruction is configured to set one or more flags in a flags register if it detects a special or exceptional case for an operand value. A checking instruction may also set the result or results of a floating-point instruction to a result value if a special or exceptional case is detected. In addition, a checking instruction may be configured to set one or more bits in status register if a special or exceptional case is detected. After a checking instruction completes execution, a subsequent microcode instruction can be executed to determine if one or more flags were set by the checking instruction. If one or more flags have been set by the checking instruction, the subsequent microcode instruction can branch to a non-sequential microcode instruction to handle the special or exceptional case detected by the checking instruction.

25 Claims, 11 Drawing Sheets

| VALUE | SIGN | EXPONENT | SIGNIFICAND |
|---|---|---|---|
| zero | x | $00\ldots00_2$ | $0.00\ldots00_2$ |
| infinity | x | $11\ldots11_2$ | $1.00\ldots00_2$ |
| QNaN | x | $11\ldots11_2$ | $1.1xx\ldots xx_2$ |
| SNaN | x | $11\ldots11_2$ | $1.0xx\ldots xx_2$ |
| denormal | x | $00\ldots00_2$ | $0.xx\ldots xx_2$ |

FIG. 2

| FP Instruction | Corresponding Checking Instruction |
|---|---|
| FSCALE | FSCALCHK |
| FXTRACT | FXTRCHK |
| FSIN | FSINCHK |
| FCOS | FCOSCHK |
| FSINCOS | FSNCSCHK |
| FPTAN | FTANCHK |
| FPATAN | FATANCHK |
| F2XM1 | F2XM1CHK |
| FYL2X | FL2XCHK |
| FYL2XP1 | FL2XP1CHK |
| FRNDINT | FIRNDCHK |
| FSTP | FSTPCHK |
| FBSTP | FBSTPCHK |

FIG. 8

| | empty | | | unsupported | | | SNaN | | | QNaN | | | infinity | | | denormal | | | default | | |
|---|---|---|---|---|---|---|---|---|---|---|---|---|---|---|---|---|---|---|---|---|---|
| | CF | PF | ZF | CF | PF | ZF | CF | PF | ZF | CF | PF | ZF | CF | PF | ZF | CF | PF | ZF | CF | PF | ZF |
| FSCALCHK | 1 | 0 | 0 | 1 | 1 | 0 | 1 | 0 | 0 | 1 | 0 | 0 | 1 | 0 | 0 | DM | 0 | 0 | 0 | 0 | 0 |
| FXTRCHK | 1 | 1 | 0 | 1 | 1 | 0 | 1 | 1 | 0 | 1 | 1 | 1 | 0 | 1 | 0 | DM | 0 | 0 | 0 | 0 | 0 |
| FSINCHK | 1 | 0 | 0 | 1 | 0 | 0 | 1 | 0 | 0 | 1 | 1 | 0 | 1 | 0 | 0 | DM | 0 | 0 | 0 | 0 | 0 |
| FCOSCHK | 1 | 0 | 0 | 1 | 0 | 0 | 1 | 0 | 0 | 1 | 0 | 0 | 1 | 0 | 0 | DM | 0 | 0 | 0 | 0 | 0 |
| FSNCSCHK | 1 | 0 | 0 | 1 | 1 | 0 | 1 | 1 | 0 | 1 | 1 | 1 | 1 | 0 | 0 | DM | 0 | 0 | 0 | 0 | 0 |
| FTANCHK | 1 | 0 | 0 | 1 | 1 | 0 | 1 | 1 | 0 | 1 | 1 | 1 | 1 | 1 | 0 | DM | 0 | 0 | 0 | 0 | 0 |
| FATANCHK | 1 | 0 | 0 | 1 | 0 | 0 | 1 | 0 | 0 | 1 | 0 | 0 | 1 | 1 | 0 | DM | 0 | 0 | 0 | 0 | 0 |
| F2XM1CHK | 1 | 0 | 0 | 1 | 0 | 0 | 1 | 0 | 0 | 1 | 0 | 0 | 1 | 0 | 0 | DM | 0 | 0 | 0 | 0 | 0 |
| FL2XCHK | 1 | 0 | 0 | 1 | 0 | 0 | 1 | 0 | 0 | 1 | 0 | 0 | 1 | 0 | 0 | DM | 0 | 0 | 0 | 0 | 0 |
| FL2XP1CHK | 1 | 0 | 0 | 1 | 1 | 0 | 1 | 1 | 0 | 1 | 1 | 1 | 1 | 1 | 1 | DM | 0 | 0 | 0 | 0 | 0 |
| FIRNDCHK | 1 | 1 | 0 | 0 | 0 | 0 | 0 | 0 | 0 | 0 | 0 | 0 | 0 | 0 | 0 | DM | 0 | 0 | 0 | 0 | 0 |
| FSTPCHK | IM | 0 | 0 | 1 | 1 | 0 | 1 | 1 | 0 | 1 | 0 | 0 | 1 | 0 | 0 | 0 | 0 | 0 | 0 | 0 | 0 |
| FBSTPCHK | 1 | 0 | 0 | 1 | 0 | 0 | 1 | 0 | 0 | 1 | 0 | 0 | 1 | 0 | 0 | 0 | 0 | 0 | 0 | 0 | 0 |

FIG. 9

APPARATUS AND METHOD FOR USING CHECKING INSTRUCTIONS IN A FLOATING-POINT EXECUTION UNIT

BACKGROUND OF THE INVENTION

1. Field of the Invention

This invention relates generally to the field of microprocessors and, more particularly, to floating-point execution units within microprocessors.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex floating-point arithmetic operations including multiplication and reciprocal operations. These specialized execution units typically comprise hardware that is optimized to perform one or more floating-point arithmetic functions.

Most microprocessors must support multiple data types. For example, x86 compatible microprocessors must execute instructions that are defined to operate upon an integer data type and instructions that are defined to operate upon floating-point data types. Floating-point data can represent numbers within a much larger range than integer data. For example, a 32-bit signed integer can represent the integers between $-2^{31}$ and $2^{31}-1$ (using two's complement format). In contrast, a 32-bit ("single precision") floating-point number as defined by the Institute of Electrical and Electronic Engineers (IEEE) Standard 754 has a range (in normalized format) from $2^{-126}$ to $2^{127} \times (2-2^{-23})$ in both positive and negative numbers.

Turning now to FIG. 1A, an exemplary format for an 8-bit integer 100 is shown. As illustrated in the figure, negative integers are represented using the two's complement format 104. To negate an integer, all bits are inverted to obtain the one's complement format 102. A constant of one is then added to the least significant bit (LSB).

Turning now to FIG. 1B, an exemplary format for a 32-bit (single precision) floating-point number is shown. A floating-point number is represented by a significand, an exponent and a sign bit. The base for the floating-point number is raised to the power of the exponent and multiplied by the significand to arrive at the number represented. In microprocessors, base 2 is typically used. The significand comprises a number of bits used to represent the most significant digits of the number. Typically, the significand comprises one bit to the left of the radix point and the remaining bits to the right of the radix point. In order to save space, the bit to the left of the radix point, known as the integer bit, is not explicitly stored. Instead, it is implied in the format of the number. Additional information regarding floating-point numbers and operations performed thereon may be obtained in IEEE Standard 754 (IEEE-754). Unlike the integer representation, two's complement format is not typically used in the floating-point representation. Instead, sign and magnitude form are used. Thus, only the sign bit is changed when converting from a positive value 106 to a negative value 108.

Numerical data formats, such as the IEEE-754, often include a number of special and exceptional cases. These special and exceptional cases may appear in one or more operands or one or more results for a particular instruction. FIG. 2 illustrates the sign, exponent, and significand formats of special and exceptional cases that are included in the IEEE-754 floating-point standard. The special and exceptional cases shown in FIG. 2 include a zero value, an infinity value, NaN (not-a-number) values, and a denormal value. An 'x' in FIG. 2 represents a value that can be either one or zero. NaN values may include a QNaN (quiet not-a-number) value and a SNaN (signaling not-a-number) value as defined by a particular architecture. The numbers depicted in FIG. 2 are shown in base 2 format as indicated by the subscript 2 following each number. As shown, a number with all zeros in its exponent and significand represents a zero value in the IEEE-754 floating-point standard. A number with all ones in its exponent, a one in the most significant bit of its significand, and zeros in the remaining bits of its significant represents an infinity value. The remaining special and exceptional cases are depicted similarly.

In order to conform to a particular numerical format, a microprocessor must be configured to detect and handle the special and exceptional cases for that format. Detecting and handling special and exceptional cases, however, generally requires additional microprocessor resources and produces undesirable execution latencies. Latencies may occur both when a microprocessor examines the operand or operands of an instruction and when it examines the result or results of an instruction. It would be desirable to reduce the latencies required to detect and handle special and exceptional cases for a numerical format. It would also be desirable to minimize and optimize the microprocessor resources required to detect and handle special and exceptional cases.

SUMMARY

The problems outlined above are in large part solved by the use of checking instructions in accordance with the present invention. Generally speaking, a checking instruction is included in the microcode of floating-point instructions to detect special and exceptional cases of a defined data format. A checking instruction is configured to set one or more flags in a flags register if it detects a special or exceptional case for an operand value. A checking instruction may also be configured to set the result or results of a floating-point instruction to a result value. In addition, a checking instruction may be configured to set one or more bits in a status register if a special or exceptional case is detected. After a checking instruction completes execution, a subsequent microcode instruction can be executed to determine if one or more flags were set by the checking instruction. If one or more flags have been set by the checking instruction, the subsequent microcode instruction can branch to a non-sequential microcode instruction to handle the special or exceptional case detected by the checking instruction.

The use of checking instructions in accordance with the present invention may allow a floating-point execution unit to detect special and exceptional cases of a defined data format in an advantageous manner. Checking instructions may simplify the microcode for microcoded floating-point instructions. By simplifying the microcode, the amount of microcode ROM space required to store the microcode may be reduced. Further, a single checking instruction may minimize the instruction latency associated with the detection of special and exceptional cases. Checking instructions may also remove the need to take a microarchitectural trap if a special or exceptional case is detected. In addition, the use of checking instructions may allow for a simplification of the hardware needed to detect special and exceptional cases. Furthermore, checking instructions may reduce the amount of constant ROM storage required to hold the possible results of special and exceptional cases.

Broadly speaking, an apparatus that includes a flag register and a first execution unit is contemplated. The first execution unit is configured to execute a plurality of microinstructions that correspond to a floating-point instruction. The plurality of microinstructions includes a checking instruction that is configured to determine whether an operand value of an operand specified by the floating-point instruction corresponds to a special or exceptional case of a defined data format. The checking instruction is also configured to signal the flag register to set one or more flags if the operand value corresponds to a special or exceptional case of the defined data format A method for executing instructions in a microprocessor is also contemplated. The method comprises decoding a floating-point instruction to determine whether the floating-point instruction is a microcoded instruction and executing a plurality of microinstructions corresponding to the floating-point instruction if the floating-point instruction is a microcoded instruction. Executing the plurality of microinstructions includes executing a first one of said plurality of microinstructions to determine whether an operand value of an operand specified by the floating-point instruction corresponds to a special or exceptional case of a defined data format, and executing the first one of the plurality of microinstructions includes setting one or more of a plurality of flags in a flag register if the operand value corresponds to the special or exceptional case of the defined data format.

In addition, a computer system comprising a microprocessor and an input/output device is contemplated. The microprocessor includes a flag register and an execution unit. The execution unit is configured to execute a plurality of microinstructions corresponding to a floating-point instruction. The plurality of microinstructions include a checking instruction that is configured to determine whether an operand value of the operand specified by the floating-point instruction is a special or exceptional case of a defined data format. The checking instruction is also configured to signal the flag register to set one or more of a plurality of flags if the operand value is a special or exceptional case of said defined data format. In addition, the input/output device is configured to communicate between the microprocessor and another computer system.

BRIEF DESCRIPTION OF THE DRAWINGS

Other objects and advantages of the invention will become apparent upon reading the following detailed description and upon reference to the accompanying drawings in which:

FIG. 2 is a table listing special cases for a defined floating-point data format.

FIG. 8 is a table listing an exemplary set of floating-point instructions and their corresponding checking instructions.

FIG. 9 is a table listing an exemplary set of flag values for special and exceptional cases that correspond to a set of checking instructions.

Figure 1:
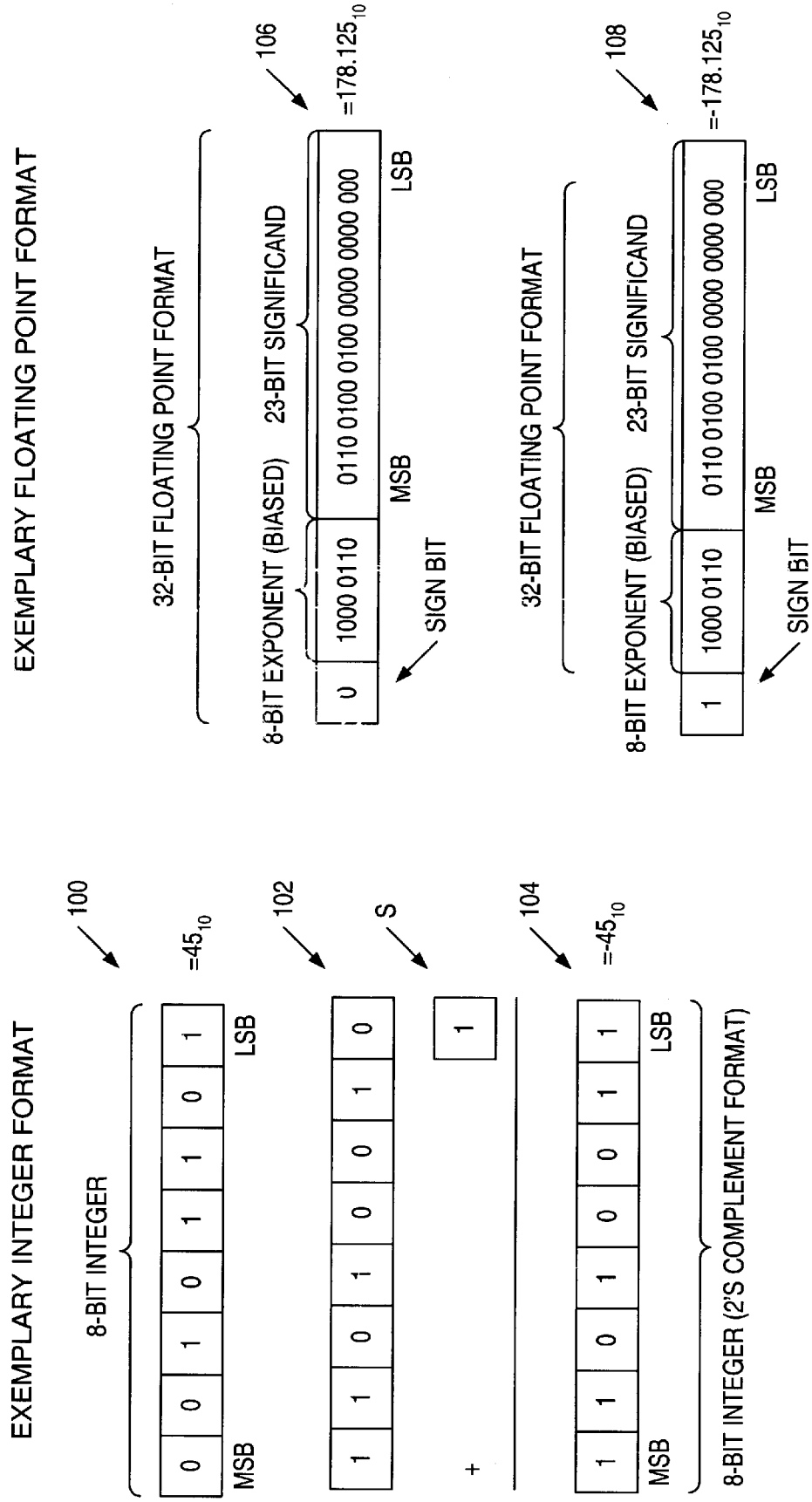
FIG. 1A is a diagram of an exemplary integer data format using two's complement representation.
FIG. 1B is a diagram of an exemplary floating-point data format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
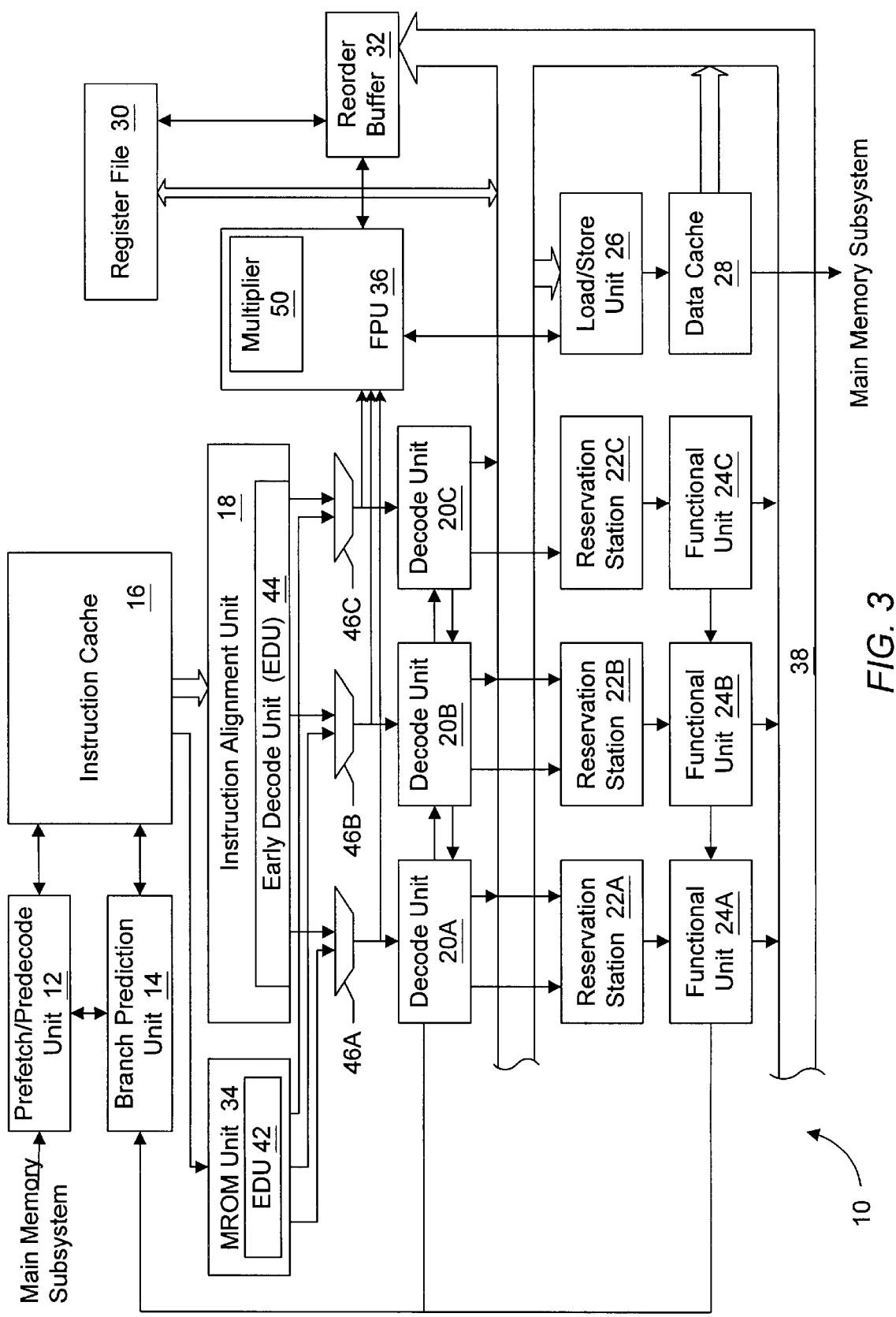
FIG. 3 is a block diagram of one embodiment of an exemplary microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 4:
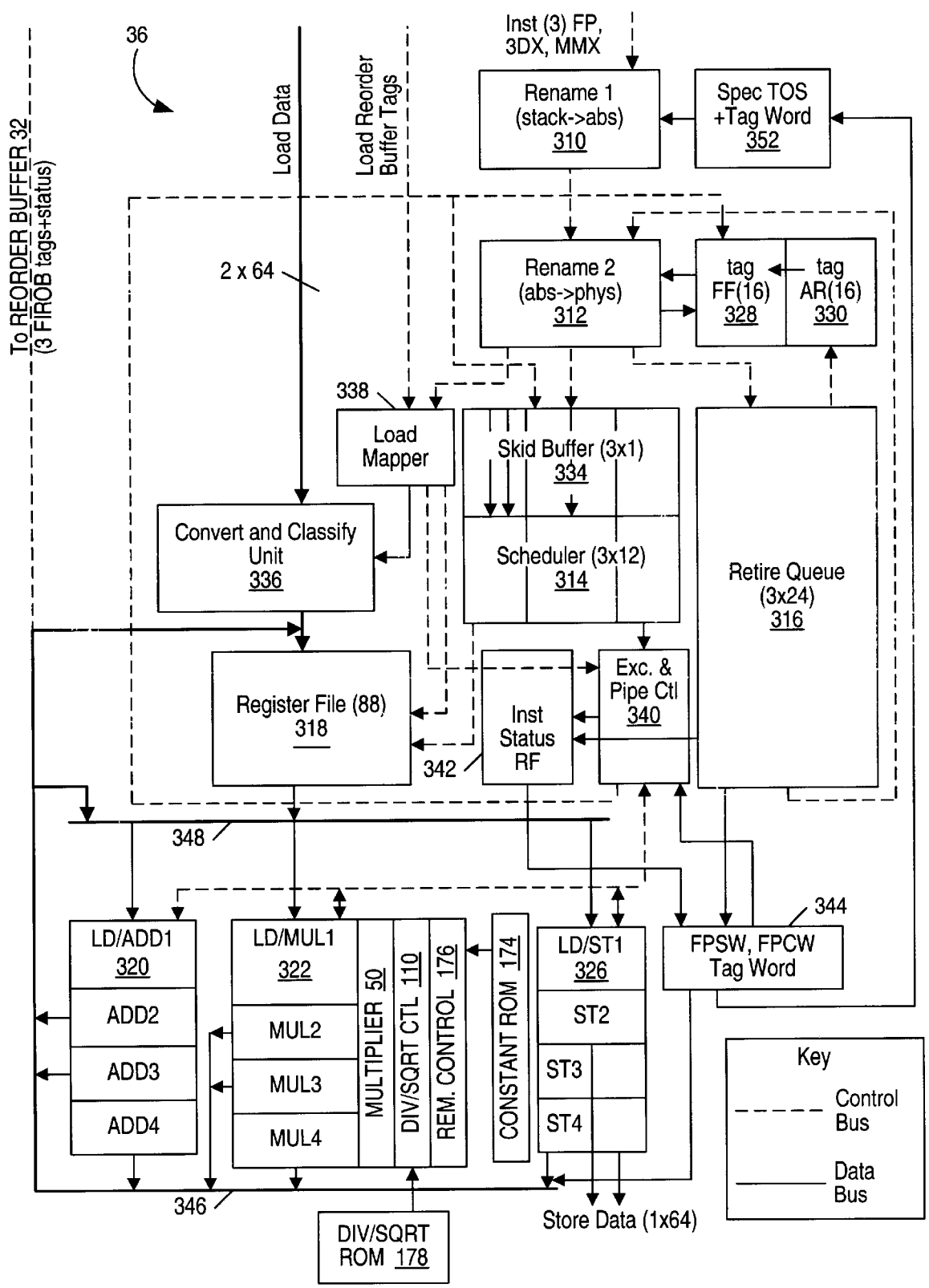
FIG. 4 is a block diagram of one embodiment of a floating-point unit from the microprocessor of FIG. 3.

Turning now to FIG. 4, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative register operands into absolute register operands. The x86 instruction set and architecture defines eight floating-point registers that are accessed in a stack-like manner (i.e., relative to a top-of-stack pointer). For instructions with memory operands, e.g., FLD instructions (floating-point load), a designated destination register can be assigned. Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction, no further execution is required, although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three instruction pipes 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for load constant instructions such as FLDPI, for transcendental computation, for FPU 36 self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denonnal results generated by during execution within instruction pipes 320, 322, and 326 are tagged when they are generated. Execution and pipe control unit 340 detects the presence of the denormal tags and calls an appropriate microcode routine from MROM 34 to handle the denornal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
|---|---|---|---|
| x | $00...00_2$ | $0.00...00_2$ | Zero |
| x | $11...11_2$ | $1.00...00_2$ | Infinity |
| x | $11...11_2$ | $1.1xx...xx_2$ | QNaN |
| x | $11...11_2$ | $1.0xx...xx_2$ | SNaN |
| x | $00...00_2$ | $0.xx...xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating-point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 320 also tracks the status of each pipe stage, receiving and prioritizing exceptions from instruction pipes 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 320. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 5:
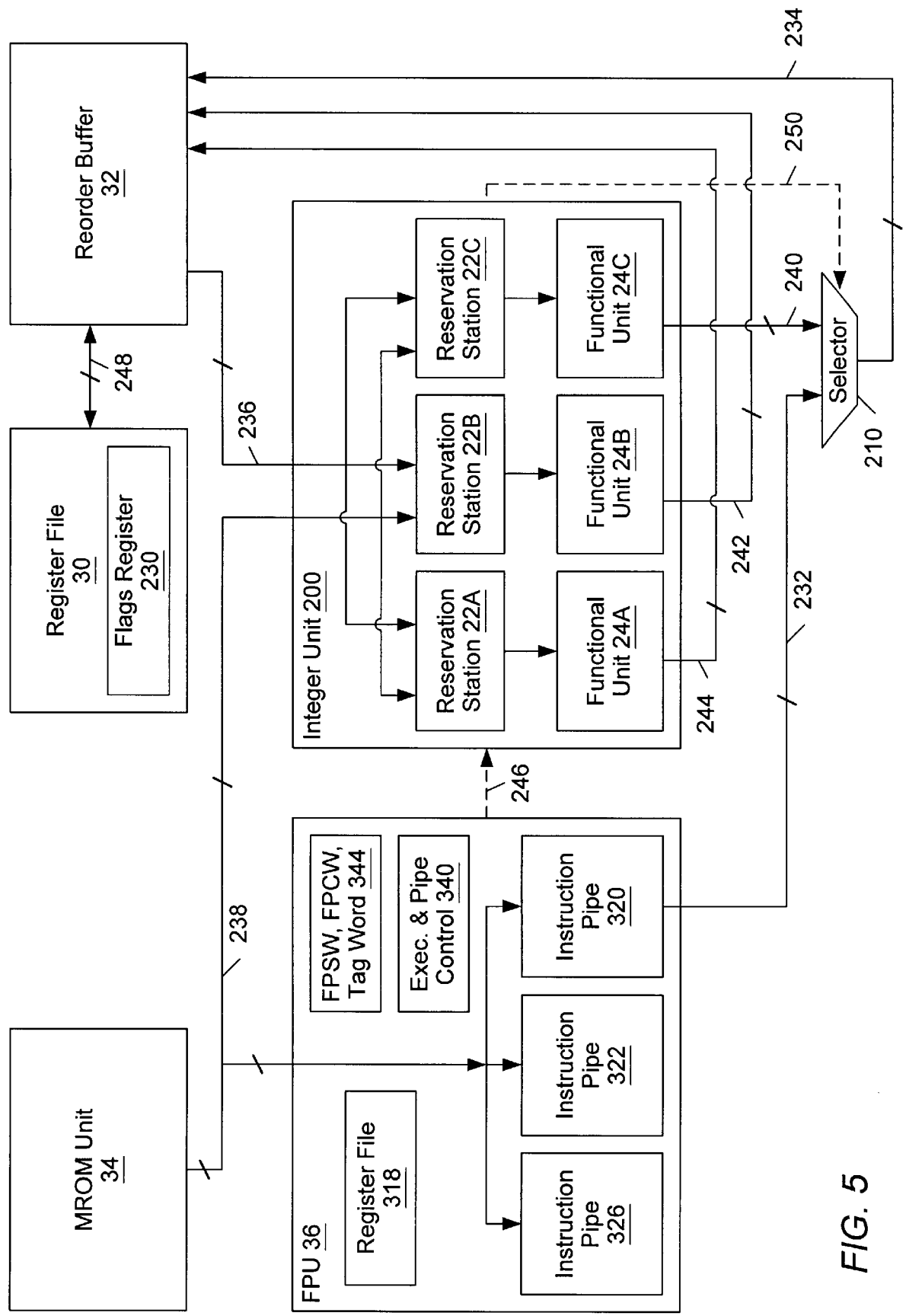
FIG. 5 is a block diagram depicting selected portions of the microprocessor of FIG. 3.
Figure 6A:
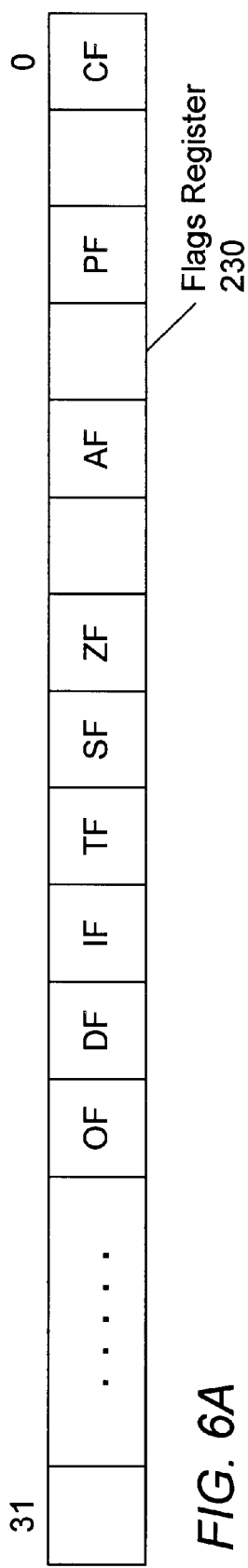
FIG. 6A is a block diagram of a first exemplary flags register.
Figure 6B:
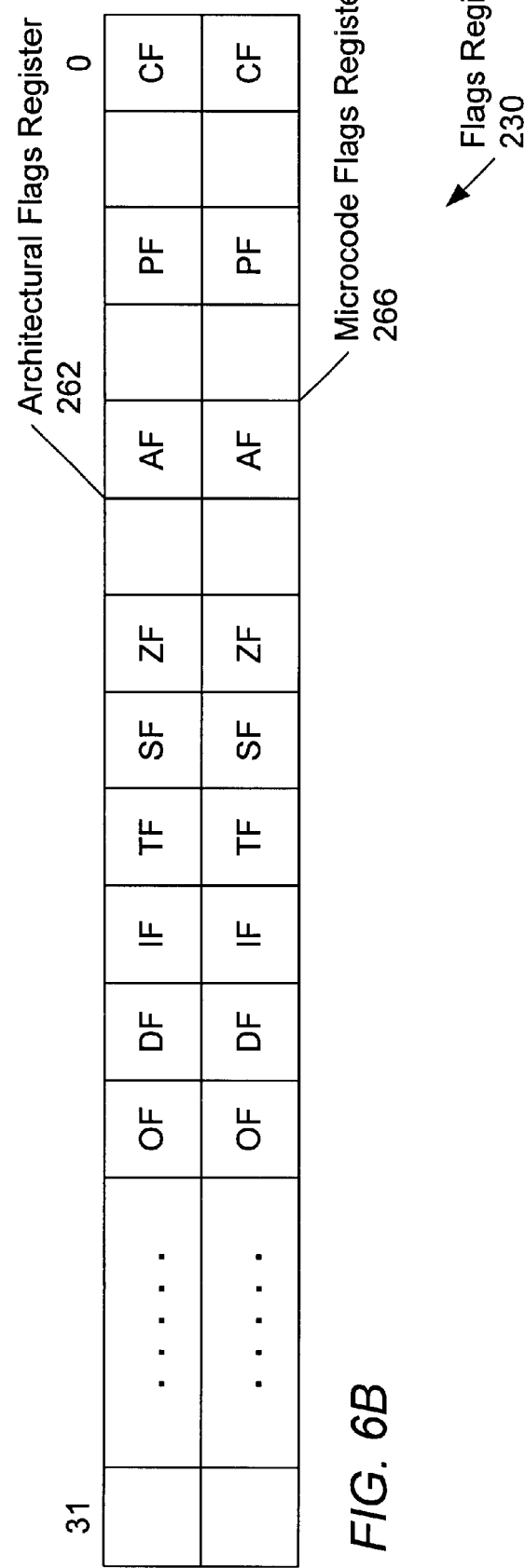
FIG. 6B is a block diagram of a second exemplary flags register.

Turning now to FIG. 5, a block diagram depicting a portion of one embodiment of microprocessor 10 is shown. Other embodiments are possible and contemplated. In FIG. 5, register file 318, floating-point status/control/tag words 344, execution and pipe control unit 340, instruction pipe 320, instruction pipe 322, and instruction pipe 326 are shown in FPU 36. Reservation station 22A, reservation station 22B, reservation station 22C, functional unit 24A, functional unit 24B, and functional unit 24C are shown in integer unit 200. A flags register 230 is shown in register file 30. Flags register 230 may include a single flags register or multiple flags registers as indicated in FIG. 6A and FIG. 6B below. MROM unit 34, register file 30, reorder buffer 32, and selector 210 are also shown. As indicated in FIG. 5, MROM unit 34 is coupled to FPU 36 and integer unit 200 via bus 238. FPU 36 is coupled to integer unit 200 via signal 246 and selector 210 via result bus 232. Integer unit 200 is coupled to selector 210 via result bus 240 and reorder buffer 32 via result buses 242 and 244. Reorder buffer 32 is coupled to register file 30 via bus 248 and to integer unit 200 via bus 236.

FPU 36 and integer unit 200 are configured to receive and execute instructions. One source of instructions for FPU 36 and integer unit 200 is MROM unit 34. MROM unit 34 is configured to store a subset of defined fast path instructions for each MROM instruction. MROM instructions may also be referred to as microcoded instructions, and each fast path instruction associated with a microcoded instruction may be referred to as a microinstruction or micro-op. In contrast, instructions that are not microcoded instructions may be referred to as fast path or direct decode instructions. Fast path or direct decode instructions include those instructions that may be directly decoded and executed by microprocessor 10.

FPU 36 is configured to execute floating-point instructions. These floating-point instructions may include x86 floating-point instructions, MMX instructions, or 3DX instructions. Floating-point instructions typically specify one or more floating-point operands and generate one or more floating-point results. Floating-point operands and results generally conform to a defined data format. A defined data format may be an industry standard data format, such as the IEEE-754 format, or an architectural data format that is defined by the architecture of a particular microprocessor or microprocessor family. FPU 36 is configured to examine operands and results corresponding to floating-point instructions to ensure that they conform to a defined data format and to detect any special or exceptional cases of that defined data format. In one embodiment, FPU 36 is configured to execute floating-point instructions whose operands and results conform to the IEEE-754 format. In another embodiment, FPU 36 is configured to execute floating-point instructions whose operands and results conform to an architecturally defined data format for microprocessor 10.

FPU 36 is configured to detect and handle special and exceptional cases of its defined data format. In one embodiment, these special and exception cases include unsupported data values, zero values, QNaN values, SNaN values, infinity values, and denornal values. The detection and handling of other special or exceptional cases is possible and contemplated. FPU 36 is configured to detect and handle special and exceptional cases for both fast path floating-point instructions and floating-point MROM instructions.

In the embodiment shown in FIG. 5, FPU 36 handles special and exceptional cases of a defined data format for floating-point MROM instructions through the use of checking instructions. A checking instruction is a microinstruction whose function is to detect and handle special and exceptional cases of a defined data format. A checking instruction is included with the set of microinstructions that correspond to a floating-point MROM instruction. The set of microinstructions for a particular floating-point MROM instruction can be referred to as the microcode for that instruction. A checking instruction is generally included in the microcode for each floating-point MROM instruction that requires the detection and handling of special and exceptional cases.

A checking instruction is configured to operate by detecting the presence of special and exceptional cases from the operands specified by the floating-point MROM instruction and provide an appropriate result or results if a special or exceptional case is detected. Upon detection of a special or exceptional case, a checking instruction is configured to set one or more flags in a flags register. A checking instruction can be configured to set one or more flags to a predetermined value or values if it detects a special case of a defined data format. A checking instruction can be also configured to set one or more flags based on a mask bit or bits of a control register if it detects an exceptional case of a defined data format. The flow of microinstructions for a floating-point MROM instruction can then be redirected by a subsequent microinstruction that is configured to jump based upon the one or more flags. By redirecting the flow of microinstructions, FPU 36 can execute the microinstructions necessary to handle a special or exceptional case that was detected by the execution of a checking instruction. The handling of a special or exceptional case may include setting one or more results to a value based upon the special or exceptional case detected and the particular instruction. The handling of a special or exceptional case may also include setting one or more bits in floating-point status word register, control word register or tag word register 344.

A checking instruction may also be said to cause a floating-point execution unit, or a portion thereof, to detect the presence of a special or exceptional case from an operand specified by a floating-point MROM instruction. In addition, a checking instruction may be said to cause a floating-point execution unit, or a portion thereof, to set one or flags of a flags register, to set one or more masks of a control register, or to provide one or more results if a special or exceptional case is detected.

Certain floating-point MROM instructions produce more than one result value. These instructions include FXTRACT, FSINCOS, and FPTAN. If a special case is detected in executing one of these instructions, a special value needs to be provided for each result value. In one embodiment, checking instructions, however, provide only one result like other instructions. In order to provide the second and any additional result values, various combinations of flags can be set in the flags register. Subsequent microinstructions can then branch on the flag combinations to execute additional microinstructions that provide the additional result values.

Generally speaking, checking instructions operate directly on the unchanged input state of the instruction for which they are designed. One exception is the FBSTPCHK checking instruction. The FBSTPCHK instruction requires preprocessed data on one of the input operands as it must perform a bounds check on a rounded input operand. Consequently, the input data is preprocessed prior to the execution of the checking instruction. Other checking instructions may function accordingly.

In one embodiment, not shown, FPU 36 detects and handles special and exceptional cases for fast path floating-point instructions by providing two parallel data paths through each of instruction pipes 320, 322, and 326. One data path in each instruction pipe 320, 322, and 326 is configured to perform the normal execution of fast path floating-point instructions while a second data path is configured to detect and handle the execution of special and exceptional cases in parallel. In this embodiment, each instruction pipe 320, 322, and 326 is configured to select the result from the normal execution path unless a special or exceptional case was detected. If a special or exceptional case was detected, the result from the special and exceptional execution path is selected. Consequently, special and exceptional cases can be detected and handled for floating-point fast path instructions with no or little additional latency. In one particular embodiment, the second data path is configured to execute checking instructions. If checking instructions do not detect a special or exceptional case, they may pass the operand or operands through the second data path unchanged.

Although the detection of special and exceptional cases can be effectively handled in a separate pipeline for floating-point fast path instructions, the same solution for a floating-point MROM instruction would be introduce a myriad of problems. For example, normal cases, i.e. those that are not special or exceptional, may require more work to execute, additional storage may be necessary for the additional results, and the correct result may be difficult to select. Also, individual microinstructions may require additional hardware to ensure their ability to detect and handle special or exceptional cases. The use of checking instructions overcomes these difficulties at the expense of a single instruction latency. In one embodiment, the instruction latency for a checking instruction is four clock cycles. In this embodiment, the instruction latency of a checking instruction is comparable to the latency of other floating-point fast path instructions. Other embodiments may execute checking instructions with different instruction latencies.

In one embodiment, FIG. 5 supports the x86 microprocessor architecture. The x86 microprocessor architecture supports several floating-point instructions that are configured to set flags in flags register 230. These instructions include FCOMI, FCOMIP, FUCOMI, and FUCOMIP. In one embodiment, these instructions set an architectural flags register such as architectural flags register 262 as indicated in FIG. 6B below. In order to support these instructions, FPU 36 is configured to set the flags in flags register 230. Accordingly, the embodiment shown in FIG. 5 indicates a connection between instruction pipe 320 of FPU 36 and register file 30. In one embodiment, instruction pipe 320 is configured as a floating-point add pipeline as noted above. That connection is represented by result bus 232, result bus 234, and bus 248. It can be noted that the connection between FPU 36 and register file 30 passes though selector 210. In one embodiment, selector 210 is configured to arbitrate result bus 234 between result bus 232 of instruction pipe 320 of FPU 36 and result bus 240 of functional unit 24C of integer unit 200. In doing so, selector 210 allows instruction pipe 320 to transmit results to reorder buffer 32 without implementing an additional result bus. Execution and pipe control unit 340 is configured to request access to result bus 234 by using signal 246 on behalf of instruction pipe 320. Integer unit 200 receives signal 246 from FPU 36 and, in turn, transmits signal 250 to selector 210. It can be noted that functional unit 24C may stall for one or more clock cycles to allow instruction pipe 320 to access result bus 234.

In one embodiment, checking instructions are configured to make use of the connection between FPU 36 and register file 30 just described. In this embodiment, checking instructions are routed to instruction pipe 320 for execution. Consequently, when a checking instruction detects a special or exceptional case of an operand value, the checking instruction can signal register file 30 to set one or more flags of flag register 230 across buses 232, 234 and 248. In addition, a checking instruction can schedule access to result bus 234 by using signal 246. In one particular embodiment, checking instructions can signal register file 30 to set one or more flags of a microcode flags register, such as microcode flags register 266 as shown in FIG. 6B, in flags register 230.

Once a checking instruction has completed execution, a subsequent microinstruction corresponding to the same floating-point instruction as the checking instruction can be executed to determine whether the checking instruction has set one or more flags. If the subsequent microinstruction determines that none of the flags it examines have been set by the checking instruction, no special or exceptional case was detected and the microcode provides the normal functionality for the floating-point MROM instruction. If, however, the subsequent microinstruction determines that the checking instruction has set one or more flags, the subsequent microinstruction can branch to a non-sequential set of instructions that are configured to handle the special or exceptional case or cases that were detected by the checking instruction. In the embodiment where FIG. 5 supports the x86 microprocessor architecture, the subsequent instruction can be selected from the instructions that are configured to branch conditionally based upon one or more flags in flags register 230. In one particular embodiment, the subsequent instruction can be selected from the instructions that are configured to branch conditionally based upon one or more flags in a microcode flags register, such as microcode flags register 266 as shown in FIG. 6B. These instructions include, among others, JC, JP, and JZ and correspond to the carry flag (CF), parity flag (PF), and zero flag (ZF), respectively. The use of other instructions based on other flags or flag values is contemplated.

In the embodiment shown in FIG. 5, reorder buffer 32 is configured to provide register operand values to the integer unit 200 across bus 236. Reorder buffer 32 may provide these register operand values from register file 30 or from a register update awaiting retirement in reorder buffer 32. Consequently, the subsequent microinstruction is configured to be executed in integer unit 200 since it relies on one or more values contained in reorder buffer 32 or register file 30. In one embodiment, the subsequent instruction may be located in a reservation station 22A, 22B, or 22C of integer unit 200 when the checking instruction executes in FPU 36. The subsequent instruction may be dispatched to a functional unit 24A, 24B, or 24C when it receives the flags register value from either reorder buffer 32 or register file 30. The subsequent instruction may receive the flags register value when the checking instruction is retired from reorder buffer 32.

In embodiment of FIG. 5, the hardware of FPU 36 and integer unit 200 can be simplified since each execution unit is configured to execute only certain types of instructions. In an alternative embodiment, not shown, checking instructions and the subsequent microinstruction can be configured to execute in a single execution unit. This single execution unit could be configured to execute instructions that operate on multiple data types, e.g. floating-point instructions and integer instructions.

FIG. 6A depicts a first exemplary flags register 230. Other embodiments of a flags register are possible and contemplated. As shown, FIG. 6A depicts a portion of an EFLAGS register implemented in an x86 compatible microprocessor. FIG. 6A depicts a thirty-two bit register that includes a plurality of flag bits. These flag bits include, starting from bit 0, a carry flag (CF), a parity flag (PF), an auxiliary flag (AF), a zero flag (ZF), a sign flag (SF), a trap flag (TF), an interrupt flag (IF), a direction flag (DF), and an overflow flag (OF). Other flags bits or additional control information may be included in flags register 230.

In one embodiment, flags register 230 may be located in register file 30 as shown in FIG. 5. In an alternative embodiment, flags register 230 may be located in an execution unit such as FPU 36 or integer unit 200.

In one embodiment that supports the x86 microprocessor architecture, checking instructions are configured to set the carry flag (CF), the parity flag (PF), and/or the zero flag (ZF) upon the detection of a special or exceptional case of an operand value. In one embodiment, a checking instruction is configured to set the CF, PF and ZF to predetermined values if a special case is detected. In an alternative embodiment, a checking instruction is configured to set the CF, PF, and/or ZF to a value or values based on one or more mask bits from a control register if an exceptional case is detected. An exemplary set of values for certain special and exceptional cases of a set of checking instructions is shown in FIG. 9 discussed below.

FIG. 6B depicts a second exemplary flags register 230. Other embodiments of a flags register are possible and contemplated. FIG. 6B depicts two thirty-two bit registers, architectural flags register 262 and microcode flags register 266, that includes a plurality of flag bits that comprise flags register 230. As shown, FIG. 6B depicts a portion of a pair of EFLAGS registers implemented in an x86 compatible microprocessor. These flag bits include, starting from bit 0, a carry flag (CF), a parity flag (PF), an auxiliary flag (AF), a zero flag (ZF), a sign flag (SF), a trap flag (TF), an interrupt flag (IF), a direction flag (DF), and an overflow flag (OF). Other flags bits or additional control information may be included in flags register 230.

In one embodiment, flags register 230 may be located in register file 30 as shown in FIG. 5. In an alternative embodiment, flags register 230 may be located in an execution unit such as FPU 36 or integer unit 200.

In one embodiment that supports the x86 microprocessor architecture, checking instructions are configured to set the carry flag (CF), the parity flag (PF), and/or the zero flag (ZF) upon the detection of a special or exceptional case of an operand value. In one embodiment, a checking instruction is configured to set the CF, PF and ZF to predetermined values if a special case is detected. In an alternative embodiment, a checking instruction is configured to set the CF, PF, and/or ZF to a value or values based on one or more mask bits from a control register if an exceptional case is detected. An exemplary set of values for certain special and exceptional cases of a set of checking instructions is shown in FIG. 9 discussed below.

FIG. 6B depicts flags register 230 as including a pair of identical flags registers—architectural flags register 262 and microcode flags register 266. Flags register 230 may include other flags registers. In one embodiment, checking instructions are configured to signal register file 30 to set one or more flags of microcode flags register 266. In this embodiment, other instructions, such as FCOMI, FCOMIP, FUCOMI, and FUCOMIP may be configured to signal register file 30 to set one or more flags of architectural flags register 262.

Figure 7A:
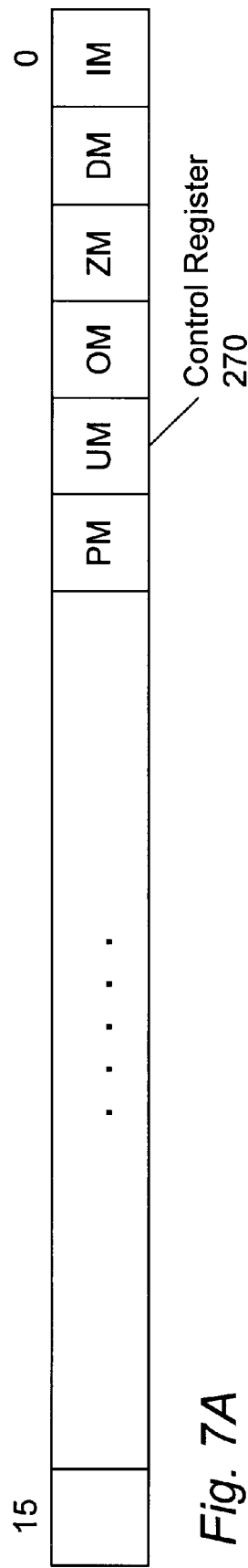
FIG. 7A is a block diagram of an exemplary control register.

FIG. 7A depicts an exemplary control register 270. Other embodiments of a control register are possible and contemplated. As shown, FIG. 7A depicts a portion of a control register implemented in an x86 compatible microprocessor. FIG. 7A depicts a sixteen bit control register that includes a plurality of mask bits. These mask bits include, starting from bit 0, an invalid mask bit (IM), a denormnal mask bit (DM), a zero mask bit (ZM), an overflow mask bit (OM), an underflow mask bit (UM), and a precision mask bit (PM). Other mask bits or additional control information may be included in control register 270. In one embodiment, control register 270 may be located in FPU 36 as shown in FIG. 4 and FIG. 5. In an alternative embodiment, control register 270 may be located in register file 30.

Figure 7B:
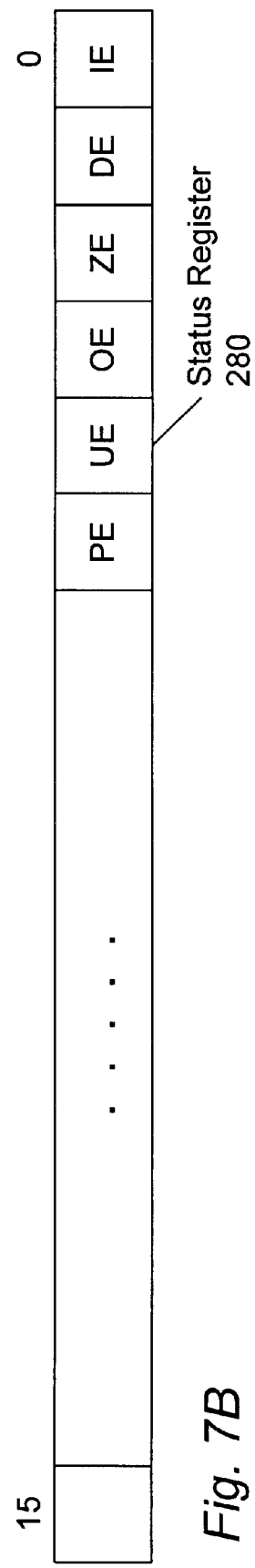
FIG. 7B is a block diagram of an exemplary status register.

FIG. 7B depicts an exemplary status register 280. Other embodiments of a status register are possible and contemplated. As shown, FIG. 7B depicts a portion of a status register implemented in an x86 compatible microprocessor. FIG. 7A depicts a sixteen bit status word register that includes a plurality of exception bits. These exception bits include, starting from bit 0, an invalid exception bit (IE), a denormal exception bit (DE), a zero exception bit (ZE), an overflow exception bit (OE), an underflow exception bit (UE), and a precision exception bit (PE). Other exception bits or additional control information may be included in status register 280. It is noted that checking instructions can be configured to set one or more bits in status register 280. These bits can be used to pass information to FPU 36 as needed. In one embodiment, status register 280 may be located in FPU 36 as shown in FIG. 4 and FIG. 5. In an alternative embodiment, status register 280 may be located in register file 30.

Turning now to FIG. 8, a table listing an exemplary set of floating-point instructions and their corresponding checking instructions is depicted. Other sets of floating-point instructions that have corresponding checking instructions are possible and contemplated. FIG. 8 lists the following floating-point instructions: FSCALE, FXTRACT, FSIN, FCOS, FSINCOS, FPTAN, FPATAN, F2XM1, FYL2X, FYL2XP1, FRNDINT, FSTP, and FBSTP. FIG. 8 also lists the following checking instructions that correspond to the respective floating-point instructions: FSCALCHK, FXTRCHK, FSINCHK, FCOSCHK, FSNCSCHK, FTANCHK, FATANCHK, F2XM1CHK, FL2XCHK, FL2XP1CHK, FIRNDCHK, FSTPCHK, and BSTPCHK. As can be seen from FIG. 8, each floating-point instruction listed has a corresponding checking instruction that is executed as part of the microcode for the particular floating-point instruction. For example, the checking instruction FSINCHK is executed as part of the microcode for instruction FSIN.

FIG. 9 is a table listing an exemplary set of flag values for special and exceptional cases corresponding to a set of checking instructions. Other sets of flag values are possible and contemplated. FIG. 9 is intended to illustrate one possible set of flag values for certain special and exceptional cases. Checking instructions may be configured to set values in other registers such as control word register 270, depicted in FIG. 7A, and status word register 280, depicted in FIG. 7B. Checking instructions may also be configured to set values to flags or other registers for special and exceptional cases not listed in FIG. 9.

In FIG. 9, the leftmost column lists a checking instruction. Other columns indicate the values assigned to the carry flag (CF), parity flag (PF), and zero flag (ZF) when a special or exceptional condition listed in the top row is detected for each checking instruction. The rightmost column indicates the values assigned to the CF, PF and ZF for the default case, i.e. no special or exceptional case is detected. For example, the checking instruction FSCALCHK is configured to set the CF to 1, the PF to 0, and ZF to 0 if it determined that an operand of a FSCALE instruction contained a SNaN. Similarly, the checking instruction FIRNDCHK is configured to set the CF to 1, the PF to 1, and the ZF to 1 if it determined that an operand of a FRNDIT instruction contained an infinity value. It can be noted from FIG. 9 that each checking instruction is configured to set the CF, the PF, and the ZF to 0 by default if no special or exceptional case is detected.

FIG. 9 also illustrates the ability of certain checking instructions to set a flag based on a value from another register. As shown, the FSTPCHK instruction is configured to set the CF to a value based on the invalid mask bit (IM) found in control register 270 (shown in FIG. 7A) if it detects an empty operand. Further, numerous checking instructions are configured to set the CF to a value based on the denormal mask bit (DM) found in control register 270 (shown in FIG. 7A) if they detect a denormal operand. Where a checking instruction sets a flag or other bit based on a value from another register, it is noted that the checking instruction may be configured to set the flag to either the actual value or the inverted value of the other register as a design choice.

It can be noted from FIG. 9 that certain checking instructions can be configured to set multiple flags for particular special or exceptional cases. As a result, various instructions subsequent to the checking instruction can branch based on different flags to various non-sequential instructions as necessary to handle the special or exceptional cases. For example, the checking instruction FXTRCHK may be configured to branch based on the CF and PF for empty, unsupported, and SNaN. The QNaN case for the FXTRCHK instruction, however, may also cause a branch based on the ZF in addition to the CF and PF.

Figure 10:
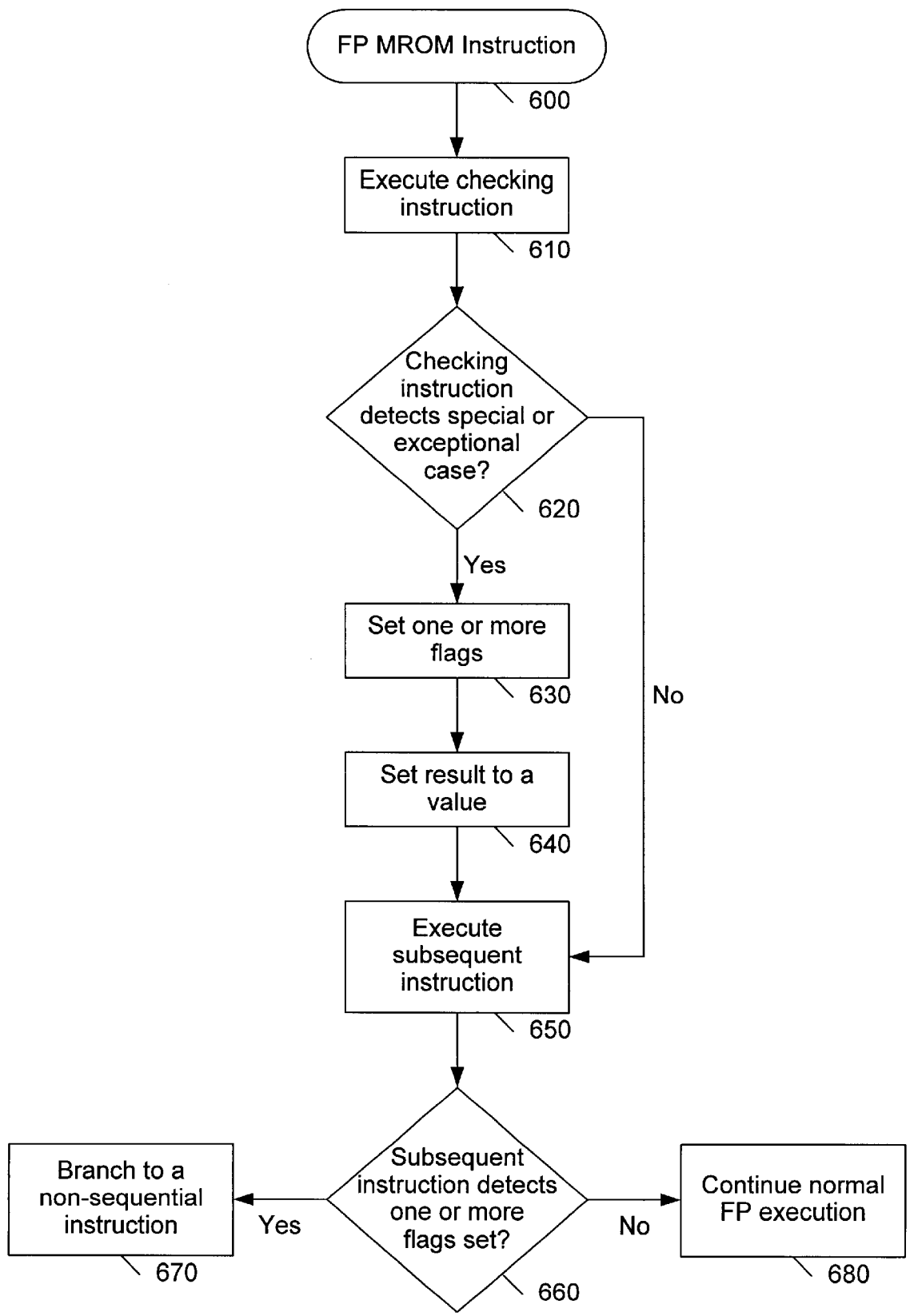
FIG. 10 is a chart depicting a method of using checking instructions.

FIG. 10 is a chart depicting a method of using checking instructions in the exemplary microprocessor of FIG. 3. Block 600 illustrates the case where a floating-point (FP) MROM instruction is to be executed by a floating-point execution unit. Block 610 illustrates executing a checking instruction. In block 620, it is determined whether a checking instructon has detected a special or exceptional case. Block 630 illustrates setting one or more flags. Block 640 illustrates setting a result to a value. Block 650 illustrates executing a subsequent instruction. In block 660, it is determined whether a subsequent instruction has detected one or more flags set. Block 670 illustrates branching to a non-sequential instruction. Block 680 illustrates continuing the normal floating-point execution.

FIG. 10 illustrates a method of using checking instructions to detect special and exceptional cases of a defined data format for floating-point MROM instructions. As indicated by block 610, a checking instruction is executed by a floating-point execution unit as part of the microcode for a floating-point MROM instruction. A checking instruction, as noted by block 620, is configured to detect special and exceptional cases of a defined data format for the operand value or values of a floating-point MROM instruction. As can be seen in block 630, a checking instruction is configured to set one or more flags if a special or exceptional case is detected. In addition, a checking instruction may set a result of the floating-point MROM instruction to a value if a special or exceptional case is detected as indicated by block 640. In one embodiment, a checking instruction is configured to set a result to a value only for certain special and exceptional cases. Stated differently, a checking instruction may be configured not to set a result for every special and exceptional case it detects. In addition, a checking instruction may be configured to set multiple results for a particular floating-point instruction. After executing a checking instruction, a subsequent instruction (also referred to as a microinstruction since it is part of the microcode for a floating-point MROM instruction) is executed as shown in block 650. The subsequent instruction determines whether one or more flag bits have been set by the checking instruction as shown in block 660. If one or more flags have been set, the subsequent instruction causes the floating-point execution unit to branch to a non-sequential instruction as shown in block 670. If no flags were set by the checking instruction, the subsequent instruction does not cause the floating-point execution unit to branch to a non-sequential instruction and the floating-point execution unit continues normal instruction execution as shown in block 680.

FIG. 10 illustrates a method that uses a checking instruction in the microcode of a floating-point MROM instruction to detect and handle special and exceptional cases of a defined data format. The method may also include steps not explicitly shown in FIG. 10. For example, a floating-point execution unit may be configured to execute both floating-point MROM instructions and floating-point fast path instructions. In one embodiment, the method may include executing a floating-point instruction as a fast path instruction if the floating-point instruction is not a microcoded, i.e. floating-point MROM, instruction. The method may also include decoding a floating-point instruction to determine whether it is a floating-point MROM instruction or a floating-point fast path instruction. In addition, the method may include setting one or more flags of a flags register based upon a value or values of a control register or setting one or more bits of a status register if a special or exceptional case is detected. It is noted that a defined data format may include the IEEE-754 format or an architecturally defined data format.

Figure 11:
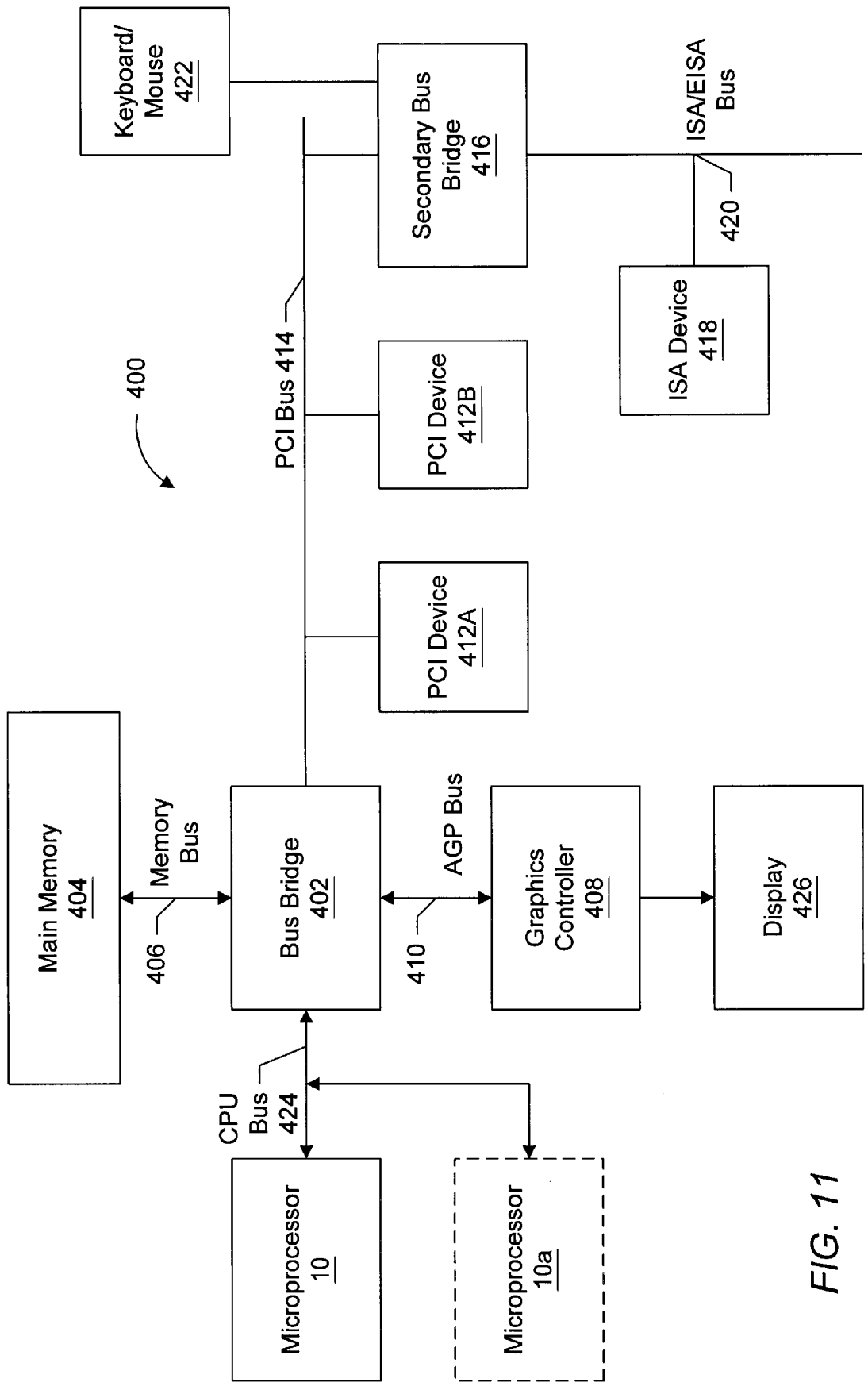
FIG. 11 is a block diagram of one embodiment of a computer system configured to utilize the microprocessor of FIG. 3.

Turning now to FIG. 11, a block diagram of one embodiment of a computer system 400 including microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. An apparatus for executing instructions in a microprocessor, comprising:
   a flag register, wherein said flag register includes a plurality of flags; and
   a first execution unit coupled to said flag register, wherein said first execution unit is configured to execute a plurality of microinstructions corresponding to a floating-point instruction, wherein said floating-point instruction specifies a first operand, and wherein said first execution unit is configured to generate a first result corresponding to said floating-point instruction;
   wherein said plurality of microinstructions include a checking instruction, wherein said first execution unit, in response to said checking instruction, is configured to:
      (i) determine whether a first operand value of said first operand specified by said floating-point instruction corresponds to a first special or exceptional case of a defined data format; and
      (ii) signal said flag register to set one or more of said plurality of flags if said first operand value corresponds to said first special or exceptional case of said defined data format.

2. The apparatus of claim 1, wherein said plurality of microinstructions includes a first microinstruction that is subsequent, in program order, to said checking instruction, and wherein said first microinstruction is configured to cause a branch to a non-sequential instruction if one or more of said flags of said flag register have been set in response to said checking instruction.

3. The apparatus of claim 2, further comprising:
   an second execution unit coupled to said first execution unit, wherein said second execution unit is configured to execute said first microinstruction.

4. The apparatus of claim 3, wherein said first execution unit comprises a floating-point execution unit and wherein said second execution unit comprises an integer execution unit.

5. The apparatus of claim 1, wherein said first execution unit includes a control register, wherein said first execution unit is configured to signal said flag register to set one or more of said plurality of flags based on a mask bit of said control register if said first operand value corresponds to said first special or exceptional case of said defined data format.

6. The apparatus of claim 1, wherein said first execution unit includes a status register, wherein said first execution unit is configured to set one or more bits in said status register if said first operand value corresponds to said first special or exceptional case of said defined data format.

7. The apparatus of claim 1, wherein said floating-point instruction specifies a second operand, and wherein said first execution unit, in response to said checking instruction, is configured to:
   (i) determine whether a second operand value of said second operand specified by said floating-point instruction corresponds to a second special or exceptional case of a defined data format; and
   (ii) signal said flag register to set one or more of said plurality of flags if said second operand value corresponds to said second special or exceptional case of said defined data format.

8. The apparatus of claim 1, wherein said first execution unit, in response to said checking instruction, is configured to set said first result corresponding to said floating-point instruction to a first result value if said first operand value corresponds to said first special or exceptional case of said defined data format.

9. The apparatus of claim 8, wherein said first execution unit is configured to generate a second result corresponding to said floating-point instruction, and wherein said first execution unit, in response to said checking instruction, is configured to set said second result corresponding to said floating-point instruction to a second result value if said first operand value corresponds to said first special or exceptional case of said defined data format.

10. The apparatus of claim 1, wherein said first execution unit includes a plurality of floating-point execution pipelines, wherein said checking instruction is configured to execute in a first of said plurality of floating-point execution pipelines, and wherein said first of said plurality of floating-point execution pipelines is coupled to said flag register.

11. The apparatus of claim 1, further comprising:
a MROM unit coupled to said first execution unit, wherein said MROM unit is configured to store said plurality of microinstructions, and wherein said MROM unit is configured to transmit said plurality of microinstructions to said first execution unit in response to receiving said floating-point instruction;
a reorder buffer coupled to said first execution unit, wherein said reorder buffer is configured to receive said plurality of microinstructions, and wherein said reorder buffer is configured to retire said plurality of microinstructions; and
a register file coupled to said reorder buffer, wherein said register file includes said flags register;
wherein said reorder buffer is configured to update said flags register when said checking instruction is retired.

12. The apparatus of claim 1, wherein said defined data format includes an IEEE-754 format.

13. The apparatus of claim 1, wherein said defined data format includes an architecturally defined data format.

14. The apparatus of claim 1, wherein said floating-point instruction comprises an x86 instruction selected from the group consisting of:
FSCALE,
FXTRACT,
FSIN,
FCOS,
FSINCOS,
FPTAN,
FPATAN,
F2XM1,
FYL2X,
FYL2XP1,
FRNDINT,
FSTP, and
FBSTP.

15. The apparatus of claim 1, wherein said checking instruction comprises a microinstruction selected from a group consisting of:
FSCALCHK,
FXTRCHK,
FSNCSCHK,
FTANCHK,
FSINCHK,
FCOSCHK,
FL2XCHK,
FL2XP1CHK,
FATANCHK,
F2XM1CHK,
FIRNDCHK,
FSTPCHK, and
FBSTPCHK.

16. A method for executing instructions in a microprocessor, comprising:
decoding a floating-point instruction to determine whether said floating-point instruction is a microcoded instruction;
executing a plurality of microinstructions corresponding to said floating-point instruction if said floating-point instruction is a microcoded instruction;
wherein said executing said plurality of microinstructions includes:
executing a first one of said plurality of microinstructions to determine whether an operand value of an operand specified by said floating-point instruction corresponds to a special or exceptional case of a defined data format; and
wherein said executing said first one of said plurality of microinstructions includes setting one or more of a plurality of flags in a flag register if said operand value corresponds to said special or exceptional case of said defined data format.

17. The method as recited in claim 16, wherein said executing said first one of said plurality of microinstructions includes setting a result corresponding to said floating-point instruction to a result value if said operand value corresponds to said special or exceptional case of said defined data format.

18. The method as recited in claim 16, wherein said executing said plurality of microinstructions further includes:
executing a second one of said plurality of microinstructions to determine whether said one or more of said plurality of flags in said flag register was set by said first one of said plurality of microinstructions, wherein said second of said plurality of microinstructions is subsequent, in program order, to said first one of said plurality of microinstructions; and
wherein said executing said second one of said plurality of microinstructions includes:
branching to a third one of said plurality of microinstructions if one or more of said plurality of flags in said flag register was set by said first one of said plurality of microinstructions, wherein said third one of said plurality of microinstructions is non-sequential to said second one of said plurality of microinstructions.

19. The method as recited in claim 16, wherein said executing said first one of said plurality of microinstructions includes setting one or more of a plurality of flags in a flag register based upon a mask bit of a control register if said operand value corresponds to said special or exceptional case of said defined data format.

20. The method as recited in claim 16, wherein said executing said first one of said plurality of microinstructions includes setting one or more bits of a status register if said operand value corresponds to said special or exceptional case of said defined data format.

21. The method as recited in claim 16, further comprising:

executing said floating-point instruction as a fastpath instruction if said floating-point instruction is not a microcoded instruction.

22. The method as recited in claim 16, wherein said defined data format includes an IEEE-754 format.

23. The method as recited in claim 16, wherein said defined data format includes an architecturally defined data format.

24. A computer system, comprising:

a microprocessor including:
- a flag register, wherein said flag register includes a plurality of flags; and
- an floating-point execution unit coupled to said flag register, wherein said floating-point execution unit is configured to execute a plurality of microinstructions corresponding to a floating-point instruction, wherein said floating-point instruction specifies an operand, and wherein said floating-point execution unit is configured to generate a result corresponding to said floating-point instruction;

wherein said plurality of microinstructions include a checking instruction, wherein said floating-point execution unit, in response to said checking instruction, is configured to:
- (i) determine whether an operand value of said operand specified by said floating-point instruction is a special or exceptional case of a defined data format; and
- (ii) signal said flag register to set one or more of said plurality of flags if said operand value is a special or exceptional case of said defined data format;

an input/output (I/O) device coupled to said microprocessor and to another computer system, wherein said I/O device is configured to communicate between said microprocessor and said another computer system.

25. The computer system as recited in claim 24, wherein said I/O device comprises a modem.

* * * * *